United States Patent [19]
Yamaguchi et al.

[11] Patent Number: 5,209,427
[45] Date of Patent: May 11, 1993

[54] BRAKE MECHANISM OF MAGNETIC RECORDING AND REPRODUCING APPARATUS

[75] Inventors: Katsumi Yamaguchi; Shinichiro Terada; Katsuya Nozawa; Toshiyuki Asanuma; Yukio Ito, all of Saitama, Japan

[73] Assignee: Clarion Co., Ltd., Tokyo, Japan

[21] Appl. No.: 683,422

[22] Filed: Apr. 10, 1991

[30] Foreign Application Priority Data

Apr. 16, 1990 [JP] Japan .................... 2-97584

[51] Int. Cl.$^5$ .............................................. G11B 15/22
[52] U.S. Cl. .................................................. 242/204
[58] Field of Search ............ 242/201, 202, 204, 156.2, 242/75.4; 360/74.1, 85, 93, 95, 96.1, 96.3, 137

[56] References Cited

U.S. PATENT DOCUMENTS

| | | | |
|---|---|---|---|
| 3,217,994 | 11/1965 | Smith | 242/204 X |
| 4,708,302 | 11/1987 | Yamaguchi et al. | 242/204 |
| 4,747,564 | 5/1988 | Tsubota | 242/156.2 X |
| 4,807,061 | 2/1989 | Yoon | 242/204 X |
| 4,899,951 | 2/1990 | Okada et al. | 242/204 |
| 4,961,120 | 10/1990 | Mototoke et al. | 242/204 X |
| 4,977,467 | 12/1990 | Kondo | 242/204 X |

*Primary Examiner*—Daniel P. Stodola
*Assistant Examiner*—John P. Darling
*Attorney, Agent, or Firm*—Wegner, Cantor, Mueller & Player

[57] ABSTRACT

A brake mechanism including a brake member, an urging force switching member pivotable and movable among a plurality of specified positions, and a single elastic member arranged between the brake member and the urging force switching member. By switching one of the action positions of the urging force switching member to another, a different urging force is applied to the brake member from the single elastic member according to the action positions. A drive and control member separately performs a switch-over between the pressing position and the releasing position of the brake member and a switch-over of one of the action positions of the urging force switching member to another.

3 Claims, 4 Drawing Sheets

BRAKE MECHANISM OF MAGNETIC RECORDING AND REPRODUCING APPARATUS

BACKGROUND OF THE INVENTION

This invention relates to a magnetic recording/reproducing apparatus for recording and reproducing information by making a magnetic tape travel by sending the tape from the supply-side reel and winding the tape on the take-up reel, and more particularly to a brake mechanism for applying a specified brake torque to the reel.

Generally, in a magnetic recording/reproducing apparatus using a magnetic tape as the magnetic recording medium, a relatively low-power brake is required which applies a back tension to the supply-side reel during tape travel to obtain a stable tape travel in addition to a powerful brake for stopping the two reels or one reel.

In this case, in a reel on the supply side during reproduction, the tension applied to the tape needs to be kept constant to achieve stable high-quality recording and reproduction. To this end, a tension control mechanism is provided which controls the tension variation within a small range by the use of a band brake and a tension arm. In a reel which serves as a supply side during reverse play, a stable travel of the tape is required. It is not necessary to control the tape tension unlike during playback, and therefore, a preload brake mechanism is provided which has the function of merely applying a brake torque to the reel.

Furthermore, it is also necessary to apply a back tension during high-speed reverse search in apparatuses of the type which are cable of high-speed reverse search to a reel serving as a supply-side reel during reverse play, in addition to the need to apply a back tension during reverse play. In this case, the back tension required during high-speed reverse search is smaller than the back tension required during reverse play. Therefore, in order to apply to the reel a desired one of multiple different back tensions with a single preload brake mechanism, a certain switching arrangement is required.

As a preload brake mechanism for applying two stages of brake torque to the reel, there is a technique disclosed in Published Unexamined Japanese Utility Model Application Sho No. 64-52136. This technique uses a mechanism for applying two stages of brake torque: a brake torque to fix one reel during tape loading and a brake torque during high-speed reverse search. Since this mechanism applies two stages of brake torque to the reel, this mechanism is applicable to a preload brake mechanism for applying two stages of brake torque during reverse play and high-speed reverse search.

However, in the technique of the above-mentioned Application model, there are provided two elastic members for applying an urging force to the brake lever and a rotary lever for switching the urging force in addition to a brake lever for applying a brake torque to the reel. The use of two elastic members limits the freedom of arrangement of the members, and requires a wide installation space, thus greatly reducing the degree of freedom of design. This makes the whole apparatus arrangement large and complicated. Moreover, in the technique of the above-mentioned Application, it is possible to switch the brake torque in two stages, but it is not possible to switch the brake torque in three or more stages. The technique of the above-mentioned Application cannot apply three different stages of brake torque to the reel in correspondence to reverse play and high-speed reverse search and stopping the reel.

As described above, in a brake mechanism used in a conventional magnetic recording/reproducing apparatus, there has been the drawback that it is impossible to switch the brake torque in three or more stages. Another drawback is that the use of two elastic members reduces the degree of freedom of design, resulting in a large and complicated arrangement of the whole apparatus.

SUMMARY OF THE INVENTION

The problems of the prior art are solved by a brake mechanism according to this invention. Specifically, the brake mechanism according to this invention comprises an urging force switching member pivotable and movable to each of plurality of positions of specified actions and a single elastic member provided between the urging force switching member and a brake member. A different urging force is applied to the brake member from the single elastic member according to the action position of the urging force switching member switched to its selected action position. In this case, a drive and control member is used to switch between the brake member to the pressing position and the releasing position and to switch the action position of the urging force switching member.

The operation of the brake mechanism according to this invention having the arrangement as described will now be described. Under the condition that the brake member is driven to the pressing position by the drive and control member and if the urging force switching member is driven to a first action position by the drive and control member, a first urging force is applied to the brake member by the elastic member, and a first brake torque is applied to the reel by the brake member. Similarly, under the condition that the brake member is driven to the pressing position by the drive and control member, if the urging force switching member is driven to a second action position different from the first action position, a second urging force is applied to the brake member by the elastic member, and a second brake torque is applied to the reel by the brake member. When three or more action positions are set in the urging force switching member, while the brake member is driven to the pressing position and if the urging force switching member is driven to an action position different from the first and second action positions, an urging force different from the first and second urging forces is applied to the brake member by the elastic member, and a brake torque different from the first and second brake torques is applied to the reel by the brake member.

As described, in the brake mechanism according to this invention, each of a plurality of brake torques can be applied to the reel by the single elastic member, so that it is not necessary to use a plurality of elastic members as in the prior art. Therefore, restrictions on the member arrangement and the required space of installation are reduced, with the result that the degree of freedom of design is improved and the whole apparatus is reduced in size and simplified.

For the drive and control member for driving and controlling the brake member and the drive and control member for driving and controlling the urging force switching member, the same or separate members can be used. When the same member is used, the number of parts used is decreased, advantageously. A possible method of drive and control of the brake member and the urging force switching member by the same or separate drive and control members is to use cams. In this case, it is convenient to design an arrangement which provides a cam for the brake member and a cam for the urging force switching member in a single drive and control member and also provides a cam for drive and control of other various mechanisms. By the arrangement described, it is possible to provide drive and control over not only the brake mechanism but also other various mechanisms by the drive and control member. If an arrangement is designed to drive a plurality of mechanisms by the single drive and control member, the number of parts of the whole apparatus is reduced and the arrangement of the whole apparatus is further reduced in size and simplified.

BRIEF DESCRIPTION OF THE DRAWINGS

FIGS. 1 to 4 are plan views of a pre-loading mechanism in a helical scanning type magnetic recording/reproducing apparatus for applying to the reels the two stages of brake torques for the corresponding reverse play and high-speed reverse search and to which a brake mechanism according to this invention is applied, wherein:

FIG. 1 shows a tape unloading state;
FIG. 2 shows FF/REW (fast feed/rewind) state;
FIG. 3 shows a reverse play state; and
FIG. 4 shows a play state.

DETAILED DESCRIPTION OF THE INVENTION

Figure 1:
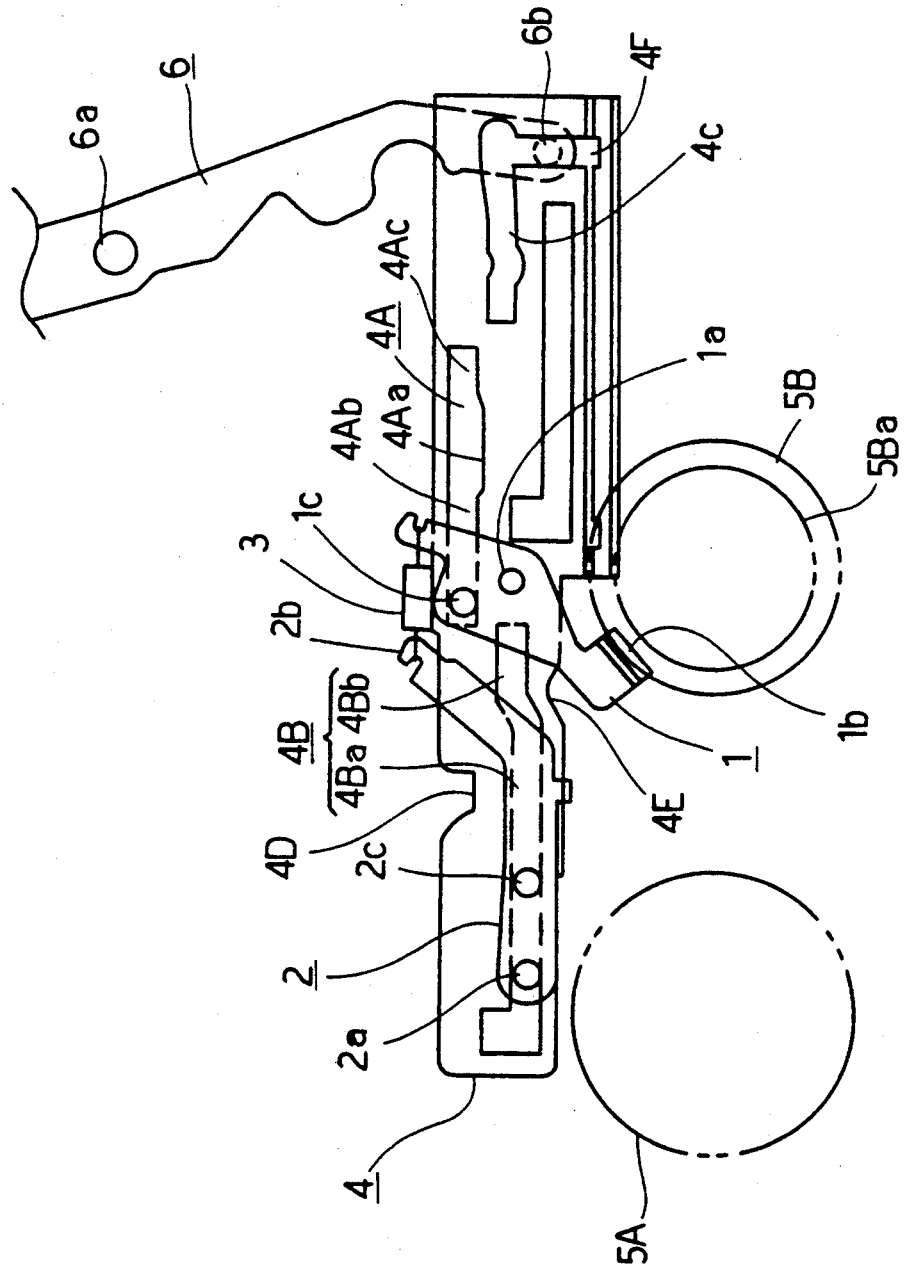

With reference to FIGS. 1 to 4, description will be made of a pre-loading mechanism in a helical scanning type magnetic recording/reproducing apparatus for applying to the reels the two stages of brake torques for the corresponding reverse play and highspeed reverse search and to which a brake mechanism according to this invention is applied.

In FIGS. 1 to 4, reference numeral 1 denotes a preload brake (brake member); 2, a reverse play plate (urging force switching member); 3, an elastic member; 4, a mode plate (drive and control member); 5A and 5B, reels; and 6, a drive link to drive the mode plate 4. The preload brake 1 is arranged in a position close to the reel 5B, is pivotable about a shaft 1a, has at one end a brake pad (pressing part) 1b, and is movable between a pressing position (FIGS. 2, 3) where the brake pad 1b is pressed against a disc 5Ba of the reel 5B and a releasing position (FIGS. 1, 4) where the brake pad 1b is released from the disc 5Ba of the reel 5B. One end of the elastic member 3 is attached to the other end of the preload brake 1, and by the urging force of the elastic member 3, the preload brake 1 is urged in the pressing direction, and when reaching the pressing position, the preload brake 1 applies large and small urging forces corresponding to two predetermined stages of brake torque. A cam follower 1c is provided near the position where the elastic member 3 is mounted and is inserted in a first cam groove 4A of the mode plate 4. Therefore, the preload brake 1 is driven to the pressing position or the releasing position by the motion and the stop position of the mode plate 4.

The reverse play plate 2 is provided so as to extend to the left side of the preload brake 1 and is pivotable about a shaft 2a provided at the left end thereof. A switch action part 2b at the right-hand end of the reverse play plate 2 is movable between a first action position (FIGS. 1, 2) close to the preload brake 1 and a second action position (FIGS. 3, 4) remote from the preload brake 1. One end of the elastic member 3 which has its other end thereof attached to the preload brake 1 as described is attached to the switch action part 2b of the reverse play plate 2. The elastic member 3 expands and contracts according to the action position of the reverse play plate 2. When the reverse play plate 2 is at the first action position, the elastic member 3 applies a small urging force to the preload brake 1 and when the reverse play plate 2 is at the second action position, the elastic member 3 applies a larger urging force to the preload brake 1. A cam follower 2c is provided near the shaft 2a of the reverse plate 2 and is inserted in a second cam groove 4B of the mode plate 4. The cam follower 2c is driven to the first or second action position by the motion and the stop position of the mode plate 4.

Figure 2:
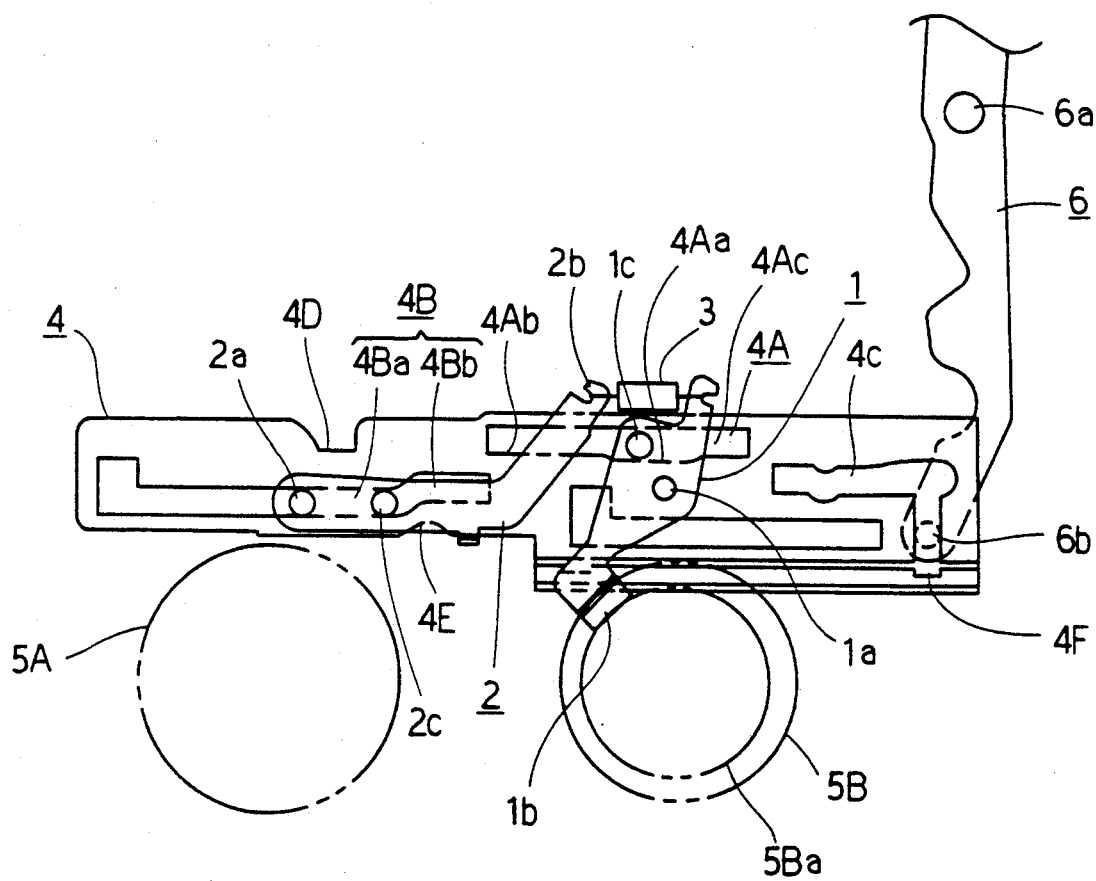
Figure 3:
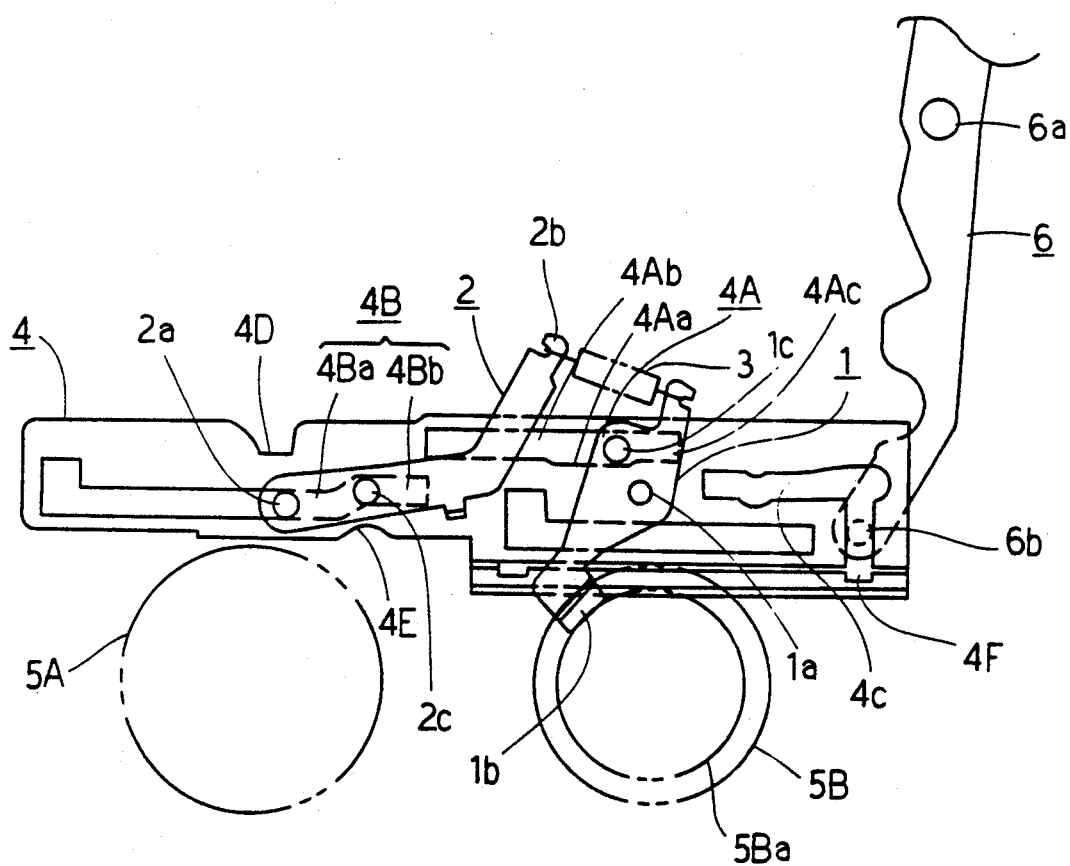
Figure 4:
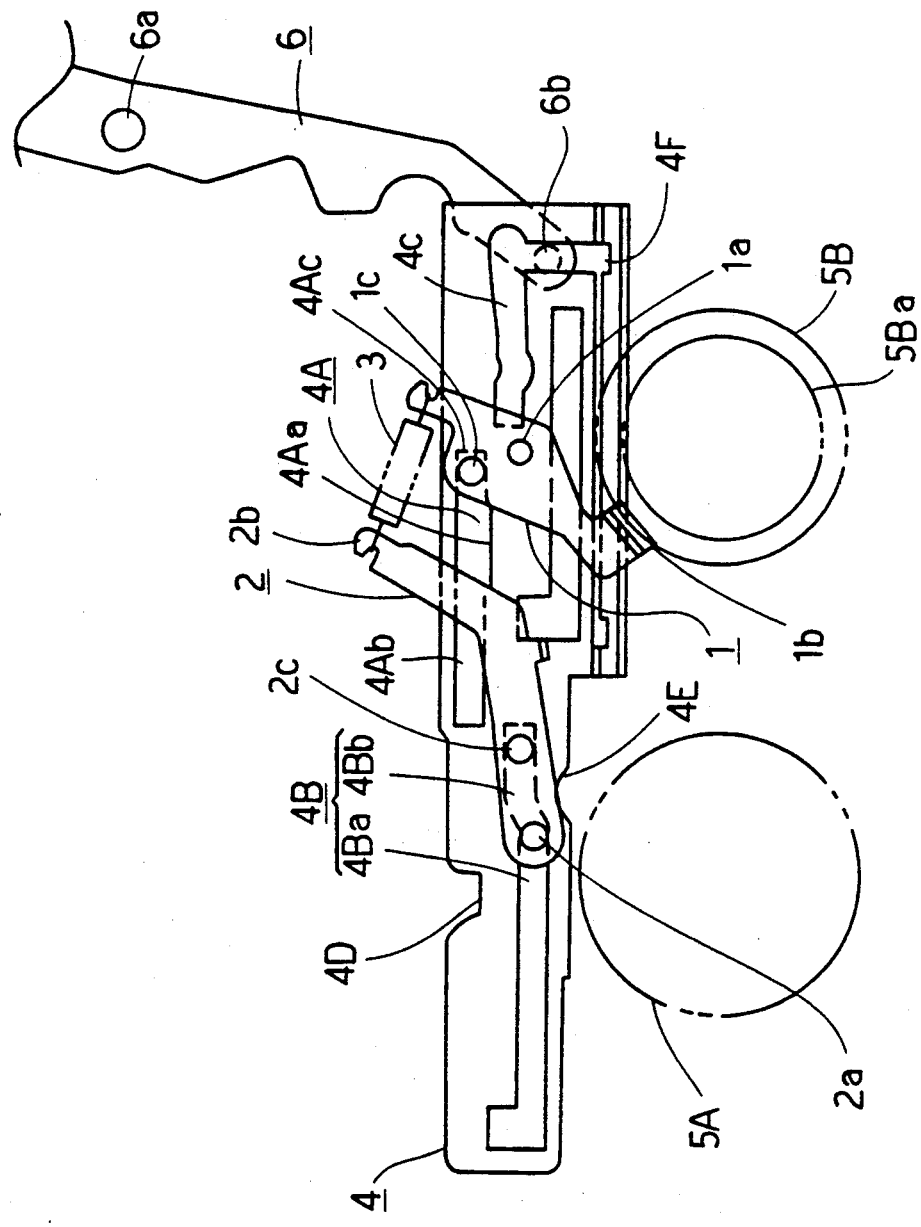

The mode plate 4 is capable of reciprocating right and left, and movable from the rightmost tape unloading position as shown in FIG. 1 to each of the FF/REW position in FIG. 2, the reverse play position in FIG. 3, and the leftmost play position in FIG. 4.

The first cam groove 4A of the mode plate 4 has a first control part 4Aa for holding the preload brake 1 at the pressing position and second and third control parts 4Ab, 4Ac for maintaining the preload brake 1 at the releasing position. As shown in FIGS. 2, 3, when the mode plate 4 is in the range from the FF/REW position to the reverse play position, the mode plate 4 holds the preload brake 1 at the first control part 4Aa, thus allowing the preload brake 1 to move to the pressing position. As shown in FIGS. 1, 4, when the mode plate 4 is at the tape unloading position or at the play position, the mode plate 4 holds the preload brake 1 at the second control part 4Ab or at the third control part 4Ac, thereby holding the preload brake 1 at the releasing position.

The second cam groove 4B of the mode plate 4 has a first holding part 4Ba for holding the reverse play plate 2 at the first action position and a second holding part 4Bb for holding the reverse play plate 2 at the second action position. As shown in FIGS. 1, 2, when the mode plate 4 is in the range from the unloading position to the FF/REW position, the mode plate 4 holds the reverse play plate 2 at the first holding part 4Ba, thus keeping the reverse play plate 2 at the first action position. As shown in FIGS. 3, 4, when the mode plate 4 is in the range from the reverse play position to the play position, the mode plate 4 holds the reverse play plate 2 at the second holding part 4Bb, thus keeping the reverse play plate 2 at the second action position.

The mode plate 4 has a third cam groove 4C and cams 4D, 4E for mode control of another plurality of mechanisms (not shown). In the right-hand end of the mode plate 4, there is provided an engaging groove 4F for engaging the drive link 6. This engaging groove 4F and the third cam groove 4C are formed in a continuous L-like configuration. The drive link 6 is pivotable about a shaft 6a, and has a drive pin 6b provided at one free pivotable end thereof. This drive pin 6b is inserted in the engaging groove 4F of the model plate 4. The drive link 6 has a drive motor side gear (not shown), connected with the other free pivotable end thereof (not shown). The drive link 6 pivots in either direction by a driving force of a drive motor (not shown), and according to the pivoting direction, the drive link 6 drives the mode plate 4 to left or right, thereby holding the mode plate 4 at the corresponding mode position.

The operation of this embodiment having the arrangement will be described in the following:

i) Tape unloading state ... FIG. 1

As shown in FIG. 1, when the mode plate 4 is at the rightmost tape unloading position, the cam follower 1c of the preload brake 1 is at the second control part 4Ab of the first cam groove 4A of the mode plate 4, so that the preload brake 1 is located at the releasing position. Thus, the brake pad 1b is released from the disc 5Ba of the reel 5B. The cam follower 2c of the reverse play plate 2 is located at the first holding part 4Ba of the second cam groove 4B of the mode plate 4, and therefore, the reverse play plate 2 is held at the first action position. In consequence, that switch action part 2b of the reverse play plate 2 to which one end of the elastic member 3 is attached is at the position close to the preload brake 1, so that the elastic member 3 is in the contracted state.

ii) FF/REW state ... FIG. 2

When the mode plate 4 has moved from the tape unloading position as shown in FIG. 1 leftward to the FF/REW position as shown in FIG. 2, the cam follower 1c of the preload brake 1 has reached the first control part 4Aa of the first cam groove 4A of the mode plate 4 and the preload brake 1 is movable to the pressing position side, so that the preload brake 1 is urged by the elastic member 3 to the pressing position and the brake pad 1b is pressing the disc 5Ba of the reel 5B. In this case, the cam follower 2c of the reverse play plate 2 is located at the first holding part 4Ba of the second cam groove 4B of the mode plate 4. Therefore, the reverse play plate 2 is held at the first action position as in the tape unloading state mentioned above, the switch action part 2b of the reverse play plate 2 is at the position close to the preload brake 1, and the elastic member 3 is in the contracted state. As a result, the elastic member 3 gives a small urging force to the preload brake 1, so that the preload brake 1 applies a small brake torque to the reel 5B.

iii) Reverse play state ... FIG. 3

When the mode plate 4 has moved from the FF/REW position as shown in FIG. 2 leftward to the reverse play position as shown in FIG. 3, the cam follower 1c of the preload brake 1 is located at the first control part 4Aa of the first cam groove 4A of the mode plate 4. Therefore, as mentioned above, the preload brake 1 is movable to the pressing position side as in the FF/REW state, and urged to the pressing position by the elastic member 3, and the brake pad 1b is pressing the disc 5Ba of the reel 5B. On the other hand, the cam follower 2c of the reverse play plate 2 has moved to the second holding part 4Bb of the cam groove 4B of the mode plate 4. As a result, the reverse play plate 2 is driven to and held at the second action position, the switch action part 2b of the reverse play plate 2 has moved to the remote position from the preload brake 1, so that the elastic member 3 is in the expanded state. Therefore, the elastic member 3 applies a large urging force to the preload brake 1, causing the preload brake 1 to apply a large brake torque to the reel 5B.

iv) Play state ... FIG. 4

When the mode plate 4 has moved from the reverse play position as shown in FIG. 3 leftward to the leftmost play position as shown in FIG. 4, the cam follower 1c of the preload brake 1 has moved to the third control part 4A of the first cam groove 4A of the mode plate 4. Therefore, the preload brake 1 is held again at the releasing position, and the brake pad 1b is released from the disc 5Ba of the reel 5B. On the other hand, the cam follower 2c of the reverse play plate 2 is located at the second holding part 4Bb of the second cam groove 4B of the mode plate 4, so that the reverse play plate 2 is located at the second action position as in the reverse play state mentioned above, the switch action part 2b of the reverse play plate 2 is set at the remote position from the preload brake 1, and the elastic member 3 is in the expanded state.

As described above, according to this embodiment, the mode plate 4 is used to drive and control various mechanisms. Therefore, by using only three dedicated component parts, that is, the preload brake 1, the reverse play plate 2, and the elastic member 3, it is possible to securely and easily switch to two stages, large and small, of brake torque during FF/REW (therefore, during high-speed reverse search) and during reverse play. Consequently, in contrast to the prior art in which the two elastic members are used, the restrictions on the arrangement of the elements are alleviated, and the required space for installation is decreased, so that the degree of freedom of design has been improved greatly, and the size reduction and simplification of the arrangement are achieved.

In the foregoing embodiment, among possible mechanisms which can be controlled by the mode plate are a brake mechanism for applying a greater brake torque to fix the reel, a tension control mechanism for controlling the tension by applying a back tension to the supply-side reel during play, a tape loading mechanism for drawing out the tape and winding the tape on a rotating drum, a mechanism for pulling out the pinch roller for tape loading, and a mechanism for switching the torque transmitted to the reel by locking or releasing the friction mechanism. It is possible to select the types and number of the mechanisms to be controlled by the mode plate when required.

In this invention, it is possible to adopt an arrangement which uses separate drive and control members to drive the brake member and the urging force switching member separately without adopting the arrangement for driving and controlling the brake member and the urging force switching member by the same drive and control member.

In addition, in this invention, by setting three or more action positions in the urging force switching member, it is possible to apply three or more stages of brake torque. For example, in the abovementioned embodiment, it is possible to cause the reverse play plate 2 to assume three or more action positions by forming the shape of the second cam groove 4B of the mode plate 4 so as to have three or more stages. Therefore, in this invention, it is possible, for example, to realize a brake mechanism for applying three different stages of brake torque during reverse play and high-speed reverse search and at stopping the reel. This contributes to further size reduction and simplification of the whole arrangement of the magnetic recording/reproducing apparatus.

While illustrating the method of actually driving and controlling the brake member and the urging force switching member using the same or individual drive and control members, the arrangement which uses cams as in the above-mentioned embodiment is very simple and convenient, but it is also possible to use methods other than the use of cams in the present invention. In addition, this invention is not limited to helical scanning type magnetic recording/reproducing apparatuses for DATs, video decks, for example, but can be applied to magnetic recording/reproducing apparatuses in ordinary tape players using fixed heads.

In addition, it is possible for those skilled in the art of this invention to provide many modifications and variations of the present invention without departing from the spirit and scope of the invention, and falling within the scope of the present invention defined in the attached claims.

What is claimed is:

1. A brake mechanism of a magnetic recording/reproducing apparatus for applying to a reel a predetermined plurality of stages of brake torque by urging forces of an elastic member, comprising:
   a brake member provided so as to be pivotable, including a pressing part for applying a brake torque to the reel by pressing, and being movable between a pressing position where a brake torque is applied to the reel and a releasing position where the reel is released;
   an urging force switching member provided so as to be pivotable and movable among a plurality of specified action positions when the brake member is stopped at the pressing position or releasing position;
   an elastic member provided between said brake member and said urging force switching member for applying a different urging force to the brake member according to the action position of said urging force switching member; and
   a drive and control member for independently driving said urging force switching member to any particular one of the plurality of specified action positions when the brake member is stopped at either of the pressing position or releasing position, and for independently driving said brake member either to the pressing position or the releasing position when the urging force switching member is stopped at one of the plurality of specified action positions.

2. A brake mechanism of a magnetic recording/reproducing apparatus according to claim 1, wherein said drive and control member includes a first cam for driving said brake member either to the pressing position or the releasing position and a second cam for driving said urging force switching member to any particular one of the plurality of positions of specified actions.

3. A brake mechanism of a magnetic recording/reproducing apparatus according to claim 1, wherein said brake mechanism is a mechanism for applying to the reel at least two stages of brake torque for the corresponding reverse play and high-speed reverse search.

* * * * *